United States Patent [19]

Nishikawa

[11] Patent Number: 5,032,873
[45] Date of Patent: Jul. 16, 1991

[54] APPARATUS FOR PROJECTING A TRANSFERRED IMAGE

[75] Inventor: Hisashi Nishikawa, Shizuoka, Japan
[73] Assignee: Tokyo Electric Co., Ltd., Tokyo, Japan
[21] Appl. No.: 228,878
[22] Filed: Aug. 5, 1988

Related U.S. Application Data

[63] Continuation of Ser. No. 26,573, Mar. 17, 1987, abandoned.
[51] Int. Cl.$^5$ .................... G03G 15/14; G03G 15/04; G03G 21/00
[52] U.S. Cl. .................... 355/271; 355/240; 355/202
[58] Field of Search .................. 355/5, 3 TR, 3 R, 15, 355/3 FU, 14 FU, 200, 202, 210, 228, 232, 235, 240, 261, 265, 271, 274, 296–297, 299; 358/286, 296, 300; 353/38, DIG. 3, DIG. 4; 346/153.1, 160

[56] References Cited

U.S. PATENT DOCUMENTS

| | | | |
|---|---|---|---|
| 3,051,044 | 8/1962 | McNaney | 355/5 |
| 3,083,623 | 4/1963 | Mott | 355/5 |
| 3,100,427 | 8/1963 | Lehmann et al. | 355/5 |
| 3,168,857 | 2/1965 | Hutto, Jr. | 355/5 |
| 3,519,344 | 7/1970 | Clark et al. | 355/5 |
| 3,754,819 | 8/1973 | Braun | 355/3 FU |
| 3,762,809 | 10/1973 | Kato et al. | 353/DIG. 4 X |
| 4,272,666 | 6/1981 | Collin | 355/3 FU X |
| 4,572,649 | 2/1986 | Takahashi et al. | |
| 4,577,955 | 3/1986 | Mayer et al. | 355/15 |
| 4,607,291 | 8/1986 | Oono | |
| 4,760,410 | 7/1988 | Kishi | 355/5 X |

FOREIGN PATENT DOCUMENTS

| | | | |
|---|---|---|---|
| 3443881 | 6/1986 | Fed. Rep. of Germany | |
| 6046277 | of 0000 | Japan | |
| 0115139 | 7/1979 | Japan | 355/3 TR |
| 0149074 | 11/1981 | Japan | 355/3 TR |
| 0159569 | 9/1983 | Japan | 355/15 |
| 0127075 | 7/1984 | Japan | 355/5 |

OTHER PUBLICATIONS

Mott, et al., "Quick Processed Bright Displays by Xerography," *Photographic Science and Engineering*, vol. 5, No. 2, 4/1961—pp. 87–92.
Brookman, et al., "Magneto-Luminescent Device," *IBM Technical Disclosure*, vol. 3, No. 2, 7/1960—p. 71.
Patent Abstracts of Japan, vol. 10, No. 312 (P-509)[2368], Oct. 23, 1986 and JP-A-61 123 864 (Mita) 11-06-1986.
Patent Abstracts of Japan, vol. 10, No. 348 (P-519)[2404], Nov. 22, 1986; and JP-A-61 148 458 (Ricoh) 07-07-1986.
Patent Abstracts of Japan, vol. 9, No. 113 (P-356)[1836] May 17, 1985, and JP-A-60 433 (Fuji Xerox) 05-0-1-1985.
Patent Abstracts of Japan, vol. 6, No. 225 (P-162)[1133], Dec. 14, 1982; and JP-A-57 151 982 (Canon) 20-09-1982.

*Primary Examiner*—A. T. Grimley
*Assistant Examiner*—Matthew S. Smith
*Attorney, Agent, or Firm*—Oblon, Spivak, McClelland, Maier & Neustadt

[57] ABSTRACT

An apparatus for projecting an image includes an image forming member on which a latent image corresponding to an original image is formed, a developing device for developing the latent image on the latent image forming member by use of a developing agent, a light reflecting panel mechanism provided with an optical reflecting surface and a light converging member for transmitting therethrough and converging the reflected beam of light from the reflected surface, and to which the duplicated image on the latent image forming member is transferred, a projection mechanism for illuminating the surface of the light reflecting panel mechanism on which the transferred image is formed and for projecting the transferred image formed on the surface onto a screen, and a cleaning mechanism for removing the transferred image on the surface of the light reflecting panel mechanism.

16 Claims, 8 Drawing Sheets

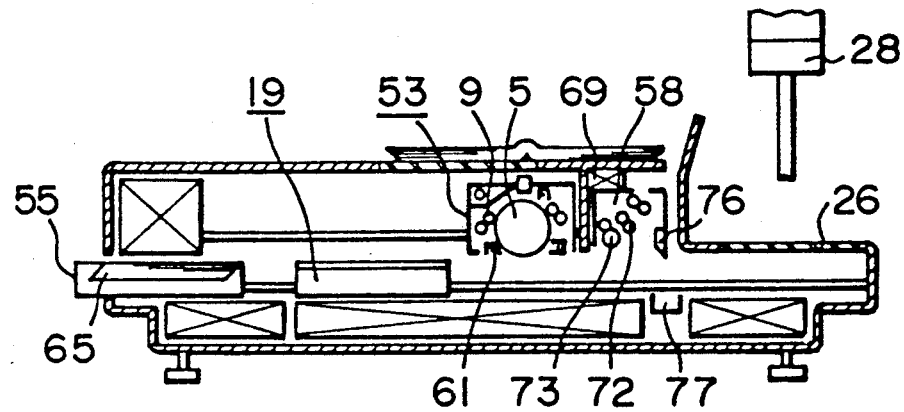
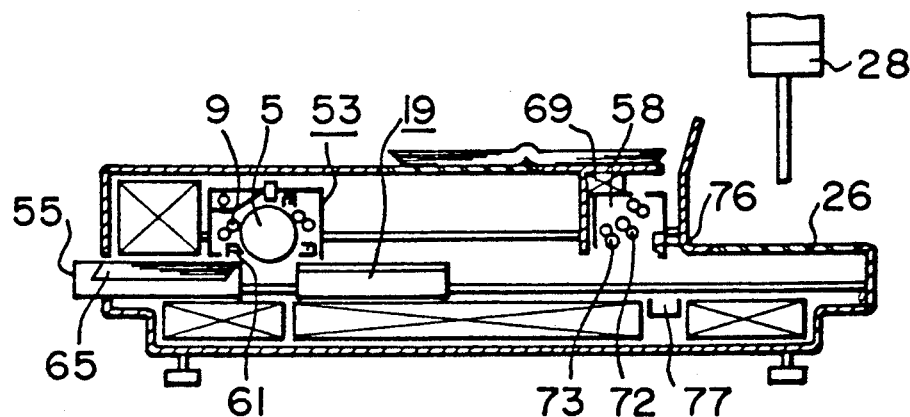
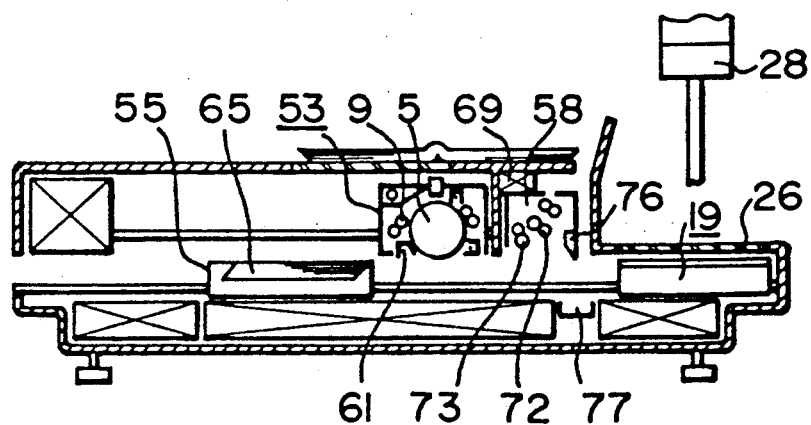

APPARATUS FOR PROJECTING A TRANSFERRED IMAGE

This application is a continuation of application Ser. No. 026,573, filed on Mar. 17, 1987, now abandoned.

FIELD OF THE INVENTION AND RELATED ART STATEMENT

The present invention relates to an image projecting apparatus for projecting an original image onto a screen optically and more particularly to an image projecting apparatus suited for application to an overhead projector (OHP).

In the overhead projectors for projecting a magnified image of an original on a screen so that many people can view the image simultaneously, there have been in use two systems, one a purely optical system and the other of a system of electronic image technology.

In the case of the system of electronic image technology, an original image is initially converted into an electric signal and then the signal is amplified and subjected to other treatments so that the image magnified is projected by means of a projection CRT or a transmission type liquid crystal display device. When this system is employed, however, the apparatus becomes costly and the brightness, clearness, and fineness of the image on the screen become rather inferior. Therefore, the apparatus of this system is not used so widely as those of the purely optical system.

As an example of those of the purely optical system, there has so far been in use one of the structure as shown in FIG. 15, which is provided with a light source 101 disposed under an original table 100 with a transparent window having a light-converging property made therein and a transparent film 102 with an image delineated therein is mounted on the original table 100, and the beam of light from the light source 101 transmitted through the film is adapted to be projected onto a screen 105 by way of a lens 103 and a mirror 104.

As another example of the conventional projectors, there is the structure as shown in FIG. 16 which is provided with a reflecting plate 106 having a light-converging property instead of an original table 100 and with a light source 101 disposed above the reflecting plate 106. With such arrangement, the beam of light from the light source 101 is directed from above to a transparent film 102 having an image delineated therein and mounted on the reflecting plate 106. Then, the beam of light transmitted through the transparent film 102 is reflected by the reflecting plate 106 and transmitted again through the transparent film 102 to be converged into a lens 103, and thus, the beam of light is projected onto a screen 105 by way of the lens 103 and a mirror 104.

Since these apparatus of purely optical system are of simple structure and manufacturable at relatively lower cost, they are widely used at conferences and preliminary meetings.

Problems with such conventional technology will now be described. In the case of the above described purely optical system, the original image must be formed on transparent film and so it has a shortcoming that an original which has not been embodied on a transparent film cannot be subjected to projection. There are also such problems that the transparent film takes some time for preparation and the film itself is rather costly.

Therefore, there is also provided a system which uses no transparent film, but utilizes the reflected beam of light from the surface of an original image delineated in ordinary paper or other recording medium to project the image on a screen. In such a system in general, however, the reflection factor of the original image is low and the reflected light cannot be effectively converged, and as a result the image projected on the screen becomes dark and sufficient brightness cannot be obtained even if a curved screen to provide improved reflecting efficiency is used.

Also, a structure capable of projecting materials for which a transparent film has not been prepared in advance was invented as described in Japanese Patent Application No. 60-46277/85, which to achieve the above mentioned effect is provided, in addition to a purely optical projection mechanism, with a mechanism for reading an original image and duplicating the image on a transparent film. More particularly, the original image is read in an optical manner and the read original image is duplicated on a duplicating medium. For the duplicating medium, ordinary paper or the like can be used as well as a transparent film. When an original image has been duplicated on a transparent film, the transparent film finished with the duplication is automatically transported to the projection mechanism and used for projection of the image on a screen. Therefore, the need for preparing the materials for projection on the screen in advance can be eliminated. Besides, if ordinary paper is remounted as a duplicating medium in place of the transparent film, it is possible to hard-copy the same image as is projected on the screen.

Even if the above described structure of Japanese Patent Application No. 60-46277 is used, however, there still remains unsolved the problem that the transparent films must be used and therefore the running cost becomes high. And, when a hard copy is to be produced, the transparent film must be removed and ordinary paper must be remounted on the place wherefrom the transparent film was removed, which requires troublesome handling. There is also such a problem that, if a hard copy is produced while making the projection, the copied medium is transported to the projection mechanism, and as a result, the projecting condition at that time is adversely affected.

OBJECT AND SUMMARY OF THE INVENTION

A first object of the present invention is to provide an image projecting apparatus capable of projecting any image without having materials prepared in the form of a transparent film or the like in advance.

A second object of the present invention is to provide an image projecting apparatus capable of projecting an image without using a transparent film.

A third object of the present invention is to provide an image projecting apparatus capable of hard-copying the same image as is projected easily and quickly.

A fourth object of the present invention is to provide an image projecting apparatus capable of hard-copying the same image as is projected without adversely affecting the projecting condition at that time.

A fifth object of the present invention is to provide an image projecting apparatus capable of projecting an image clearly.

A sixth object of the present invention is to provide an image projecting apparatus allowing superimposition of another image over the image being projected or entry of some remarks into the same.

In order to achieve the above mentioned objects, the present invention is adapted to form a latent image corresponding to an original image on a latent image forming member, to turn the latent image into a developed image with a developing agent, to transfer the developed image to a panel mechanism to form a transferred image thereon, to project the transferred image by means of a projection mechanism, and to remove, by means of a cleaning mechanism, the transferred image after projection from the panel mechanism for repeated uses of the same. Therefore, it is possible to project any image without having materials prepared in the form of a transparent films or the like in advance. Further, the labor for materials preparation is saved and the use of the costly transparent films is eliminated.

DESCRIPTION OF THE PREFERRED EMBODIMENT

Figure 1:
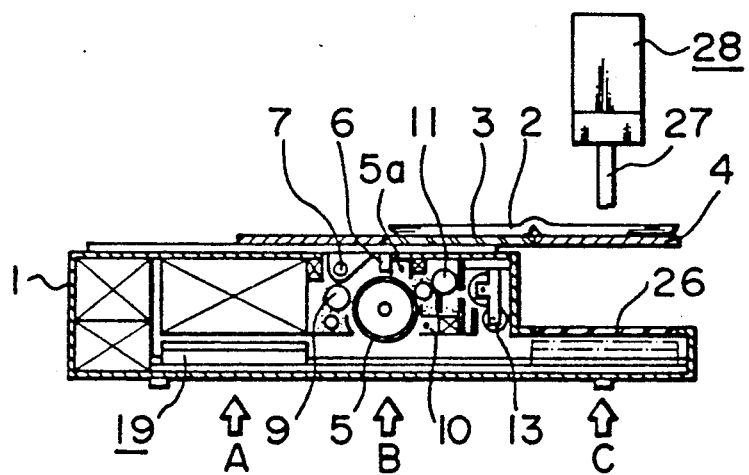
FIG. 1 is an overall front view in vertical section of a first embodiment of the present invention excluding its projection mechanism portion.
Figure 2:
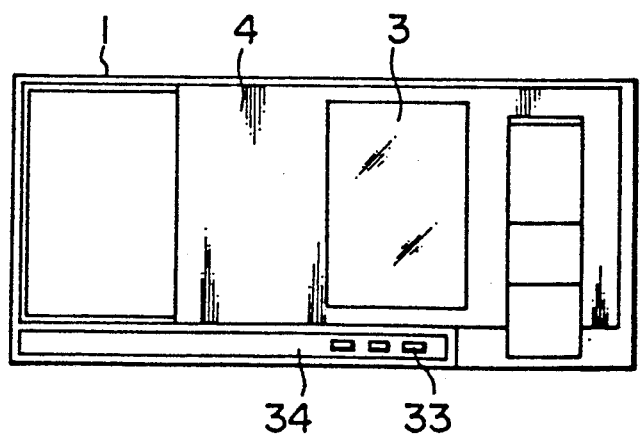
FIG. 2 is an overall plan view.
Figure 3:
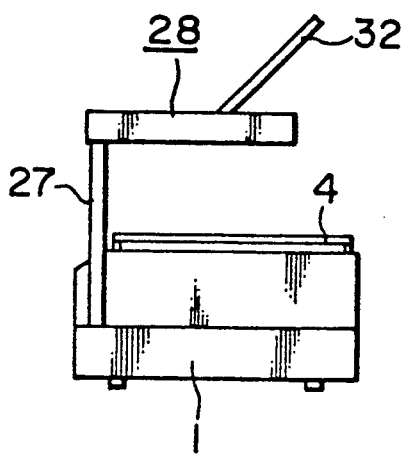
FIG. 3 is a side view of the same.
Figure 4:
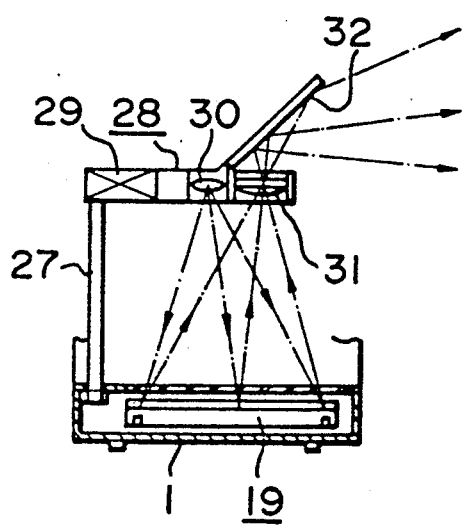
FIG. 4 is a side view in vertical section of the projection mechanism portion.
Figure 5:
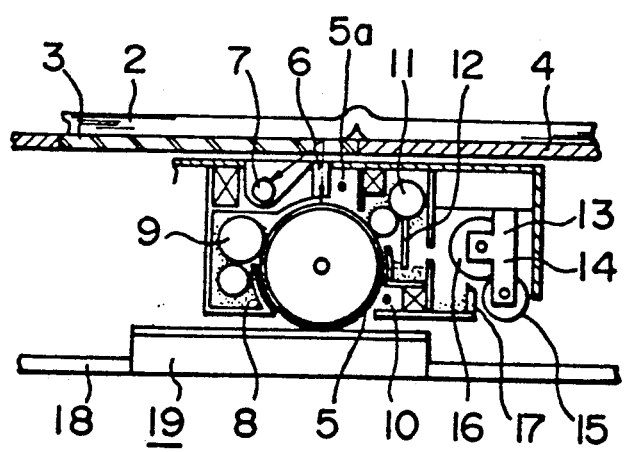
FIG. 5 is an enlarged front view in vertical section of a part of the duplication mechanism portion.
Figure 6:
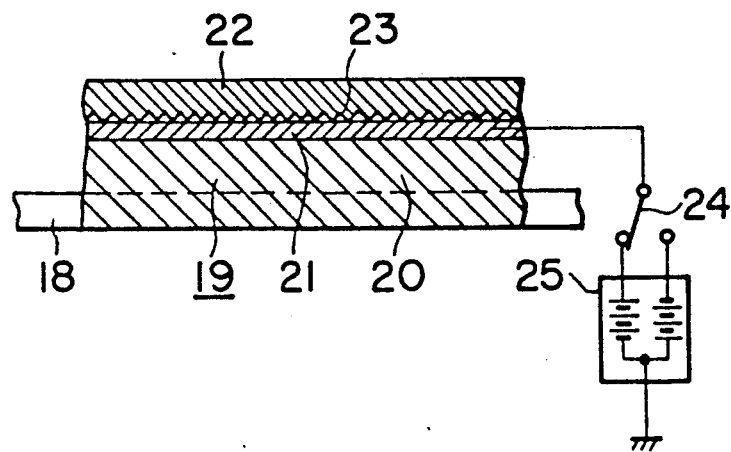
FIG. 6 is a front view in vertical section of a portion of a light reflecting panel mechanism.
Figure 7:
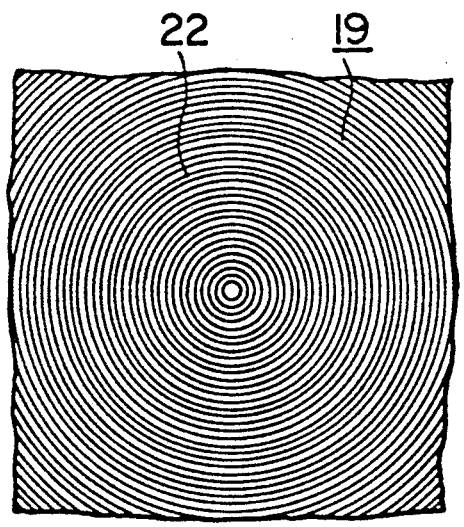
FIG. 7 is a partial plan view showing the center portion of the same.

A first embodiment of the present invention will be described below with reference to FIGS. 1 to 7. A housing 1 is provided shaped in the form of a box, and an original table 4, which is provided with a transparent window 3 in a portion thereof and on which an original 2 is to be mounted, is operably attached to the top face of the housing 1 for horizontal reciprocation.

Within the housing 1, there is horizontally disposed a drum-shaped photosensitive drum 5 as the latent image forming member. The photosensitive drum 5 is of the type to form an electrostatic latent image thereon when subjected to the beam of light. Above the photosensitive drum 5 is disposed a linear rod lens array 6 for projecting the image of the original 2 on the photosensitive drum 5, and at a side of the rod lens array 6, there is disposed a light source 7 for illuminating the surface of the original 2. Further, at a side of the rod lens array 6, there is provided a charger 5a for electrifying the photosensitive drum 5.

At one side of the photosensitive drum 5, there is provided a developing device 9 for developing the electrostatic latent image formed on the photosensitive drum 5 with a developing agent 8, such as, for example, a toner. Below the other side of the photosensitive drum 5 is provided a discharger 10 for eliminating an electrical charge from the photosensitive drum 5 above the discharger 10 is provided a photosensitive member cleaning mechanism 11 for cleaning the surface of the photosensitive drum 5, and the photosensitive member cleaning mechanism 11 is made up of two rollers, one of which is in contact with the photosensitive drum 5, and a blade 12 for removing the developing agent 8 attached to the surface of the other roller.

Further to the side of the discharger 10, which is situated at the side of the photosensitive drum 5, there is disposed a cleaning mechanism 13. The cleaning mechanism 13 has two rollers 15, 16 moving up and down and supported by a supporting mechanism 14, and there is fixedly provided a blade 17 which will be put in contact with the roller 16, the upper of the two, when the same comes down to have the developing agent 8 removed. Here, one roller 15 is a fur roller of velvet or the like and the other roller 16 is a magnet roller. This magnet roller has apposite polarity to that of the developing agent 8.

Below the photosensitive drum 5 are provided guide rails 18 disposed horizontally. To the guide rails 18 is operably attached a light reflecting panel mechanism 19 as the panel mechanism for reciprocation. The light reflecting panel mechanism 19 is made up of a base plate 20 attached to the guide rails 18, an electrode 21 disposed over the base plate 20, and a Fresnel lens 22 as the light converging member disposed over the electrode 21. The Fresnel lens 22 is formed by injection molding of acrylic resin, to which the surface forming a transferred image thereon is applied a surface coating of a thin film of $SiO_2$ or the like by electron beam evaporation so that it may not be easily scratched. The electrode 21 is an aluminum plate whose surface facing the Fresnel lens 22 is mirror ground into a reflecting surface 23. The electrode 21 may also be provided by forming a thin film of aluminum by such a method as evaporation on the grooved surface of the Fresnel lens 22 instead of using the aluminum plate.

The electrode 21 is connected with a changeover switch 24 whereby its connections are switched from one polarity to the other by a power source 25 so that the applied voltage or applied potential thereto may be changed over.

The light reflecting panel mechanism 19 is adapted to reciprocate between the home position A at the left-hand side of FIG. 1 and the projection position C at the right-hand side across the transfer position B right under the photosensitive drum 5. Above the light reflecting panel mechanism 19 when at the projection position C is horizontally a transmission window 26 formed of a transparent material.

Further, there is set up a pillar 27 on the housing 1 and a projection mechanism 28 is attached to the top of the pillar 27. The projection mechanism 28 is made up of a lamp 30 connected to a control unit 29 for illuminating the transfer surface of the light reflecting panel mechanism 19 and a projecting lens 31 for receiving the reflected light therefrom and projecting the reflected image on a screen, not shown, by way of a reflecting mirror 32.

In the front of the housing 1, there is provided a control panel 34 with operating buttons 33 thereon.

With the described structure, in order to project an image on the screen, an original 2 is mounted on the transparent window 3 in the original table 4. As the original 2, at this time, one bound in a book can be used as well as one in a sheet form.

Here, the original table 4, the photosensitive drum 5, and the light reflecting panel mechanism 19 together are driven in synchronism. That is, with the movement of the original table 4, the original image illuminated by the light source 7 is focused on the surface of the photosensitive drum 5 by means of the rod lens array 6. At this time, the circumferential surface speed of the photosensitive drum 5 is equal to the traveling speed of the original table 4, and the photosensitive drum 5 is already electrified by means of the charger 5a, and therefore, an electrostatic latent image identical to the original image is formed on the photosensitive drum when the optical image from the original is focused thereon.

Then, the developing agent 8 is attached to the surface of the photosensitive drum 5 by means of the developing device 9, whereby the electrostatic latent developed image is formed. The developing agent 8 is charged with one polarity, i.e., it is charged, for example, with negative charge.

When the front end of the developed image has come to the lowest position, the front end of the light reflecting panel mechanism 19 in synchronism therewith is in a corresponding position, and, the electrode 21 is applied with a potential from the power source 25 of an opposite polarity to that of the developing agent 8 to attract the developing agent 8 on the photosensitive drum 5 thereto. As a result, the developing agent 8 is transferred to the surface of the light reflecting panel mechanism 19 at its contacting portion with the photosensitive drum 5 and thus a transferred image is formed. At this time, by virtue of the synchronized operations of the photosensitive drum 5 with the light reflecting panel mechanism 19, no waste of time is produced in the series of operations from the formation of the electrostatic latent image on the photosensitive drum 5 to the development of the electrostatic latent image and its transfer to the light reflecting panel mechanism 19.

The light reflecting panel mechanism 19 on which the transferred image is formed in the described manner advances to the projection position C and stops there. The potential is kept applied to the electrode 21 until the transferred image finishes serving its purpose. In this state, the projection mechanism 28 is operated so as to project the transferred image on the screen. That is, the light reflecting panel mechanism 19 whose Fresnel lens 22 is illuminated by the light of the lamp 30 incident on its transferred image portion reflects the light from the reflecting surface 23 under the Fresnel lens 22 with a large quantity of light. The reflected light is transmitted through the Fresnel lens 22 again whereby it comes to contain the transferred image and converged into the projecting lens 31 in such state. The converged light is focused on the screen by way of the reflecting mirror 32, and thus, the transferred image formed on the light reflecting panel mechanism 19 is projected onto the screen. Therefore, it is made possible to project any image without first preparing materials on such a medium as a transparent film in advance and hence it is possible to meet a sudden requirement to project an existing image for which no transparent film or the like has been prepared. And, the labor for preparing projected materials can be saved and the need for the use of costly transparent films can be eliminated. Incidentally, at the time of such projection, the Fresnel lens 22 serves as a concave lens for converging the incident beam of light thereon onto the projecting lens 31 and compensating for lowered peripheral light quantity. As a result, the projecting condition on the screen becomes clear and distinct.

During such projection, the transmission window 26 serves to protect the light reflecting panel mechanism 19 as well as the transferred image formed thereon. In addition thereto, by placing during the projection of an image a transparent film with an image formed thereon on the transmission window 26 or by writing characters or drawing patterns thereon, such effects can be obtained as if another image were superimposed upon the transferred image on the light reflecting panel mechanism 19 or some entries were made therein.

When the projection has been finished in the described manner, the light reflecting panel mechanism 19 is shifted in the reset direction by operating the operating button 33, when, in synchronism with this movement, the rollers 15, 16 of the cleaning mechanism 13 are lowered, whereby the roller 15 comes in contact with the surface of the light reflecting panel mechanism 19 to remove the developing agent 8 forming the transferred image. At this time, the polarity of the voltage applied to the electrode 21 is changed by means of the changeover switch 24 over to the polarity to repulse the developing agent 8 of the transferred image, i.e., to the opposite polarity to that of the developing agent 8. And thereby, the developing agent 8 on the light reflecting panel mechanism 19 is satisfactorily removed therefrom and transferred to the roller 15. The removed developing agent 8 is then uniformly transferred to the roller 16 having similarly the opposite polarity to that of the developing agent 8 and scraped off by the blade 17 to be dropped into a developing agent reservoir. Thus, the surface of the light reflecting panel mechanism 19 is cleaned and made ready for reuse.

Figure 8:
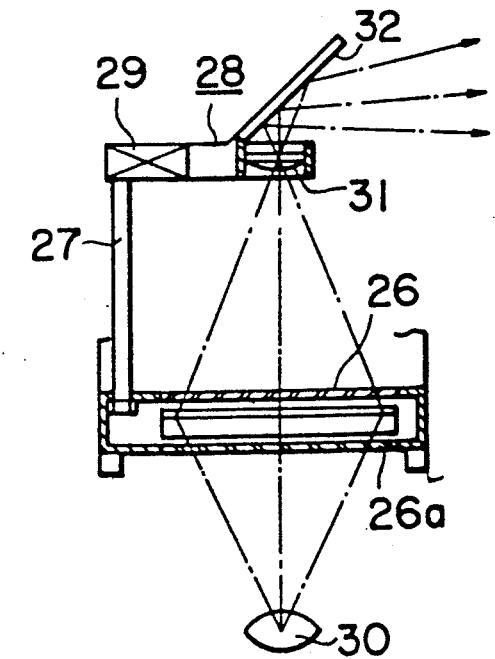
FIG. 8 is an overall side view in vertical section showing an example employing a panel mechanism of a light transmission type as a variation.

An example of a variation in connection with the projection mechanism 28 is shown in FIG. 8. In this case, as shown in FIG. 8, the lamp 30 is disposed below the housing 1 and a bottom transparent window 26a is made in the bottom face of the housing 1 so that the panel mechanism is illuminated from below by the light from the lamp 30. At this time, as the panel mechanism, the light reflecting panel mechanism 19 of the reflection type cannot of course be used but a panel mechanism of a light transmission type must be used.

In actual practice, a latent image forming member of a magnetic latent image type may be used. That is, multiple magnetic heads converting reflected beams of light from the original 2 into electric signals to be output therefrom can be brought into contact with a magnetic drum so that a magnetic latent image may be formed on the magnetic drum. Further, that used for the latent image forming member is not limited to the photosensitive drum 5 but it can be structured in a belt form or the like.

Now, a second embodiment of the present invention will be described with reference to FIG. 9 to FIGS. 14(a)-(e), wherein like or corresponding parts to those in the first embodiment are denoted by like reference numerals and explanation about those will be omitted. The present embodiment is essentially different from the first embodiment in that it is made capable of not only projecting but also hard-copying. It is also different from the first embodiment in that, in the mechanism to read the original image, the original image is held stationary and the light source 7 as well as the photosensitive drum 5 are made movable. As to these different points, detailed description will be made in the following.

The transparent window 3 and original table 4 are arranged to be stationary with reference to the housing 1. Within the housing 1, there are provided two sets of rails 50 and 51 in parallel but at different altitudes. On one set of rails 50 is slidably mounted a duplication mechanism 53 to be driven by a drive unit 52. On the other set of rails 51 are slidably mounted a paper tray 55 to be driven by a drive unit 54 as well as the light reflecting panel mechanism 19 to be driven by a drive unit 56. These drive units 52, 54, 56 are controlled by a control unit 57. Within the housing 1, there is also provided a fixing device 58 adjacent to the transmission window 26.

Figure 9:
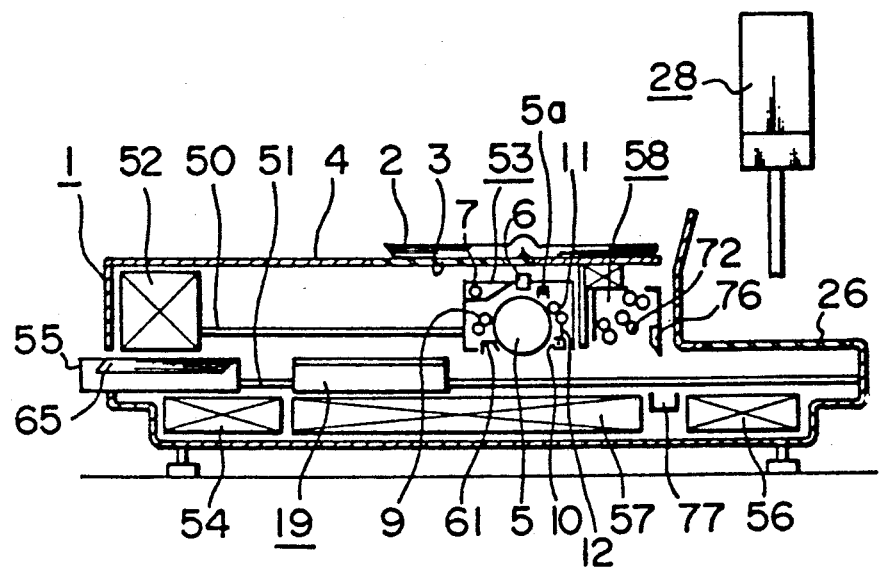
FIG. 9 is an overall front view in vertical section of a second embodiment of the present invention excluding its projection mechanism portion.
Figure 10:
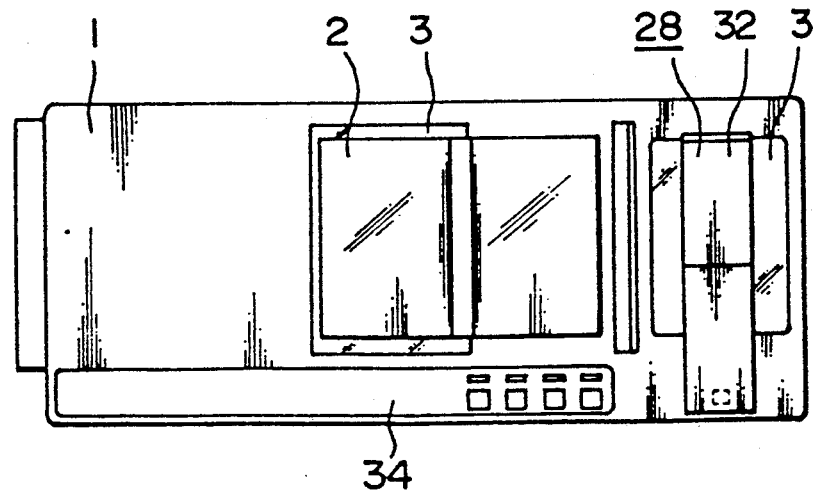
FIG. 10 is an overall plan view.
Figure 11:
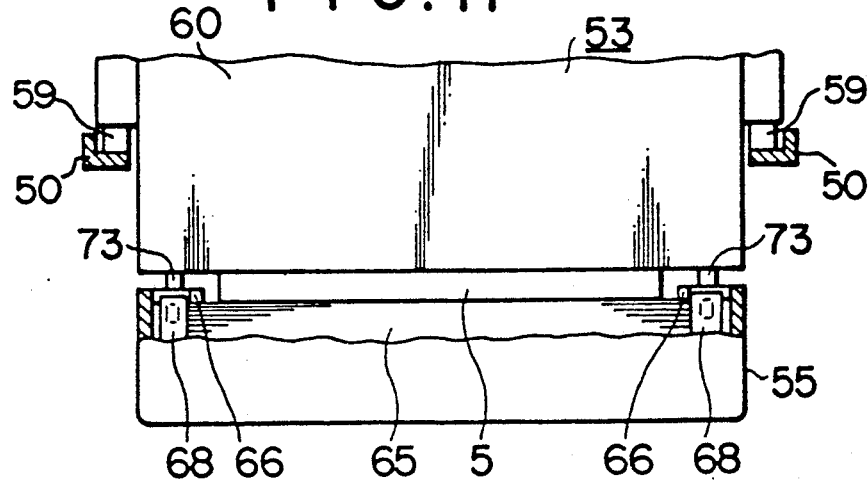
FIG. 11 is a side view showing a duplication mechanism supporting structure.

The duplication mechanism 53, as shown in FIG. 9, includes a photosensitive drum 5, charger 5a, rod lens array 6, light source 7, developing device 9, discharger 10, photosensitive member cleaning mechanism 11, and the blade 12 retained in a movable retaining member 60, which is provided with rollers 59 rolling on the rails 50 at both sides thereof. The installed positions of these components are virtually the same as those in the first embodiment. In the present embodiment, a transfer charger 61 as the transferring device is further retained in the movable retaining member 60. The same is retained below the developing device 9.

Figure 12:
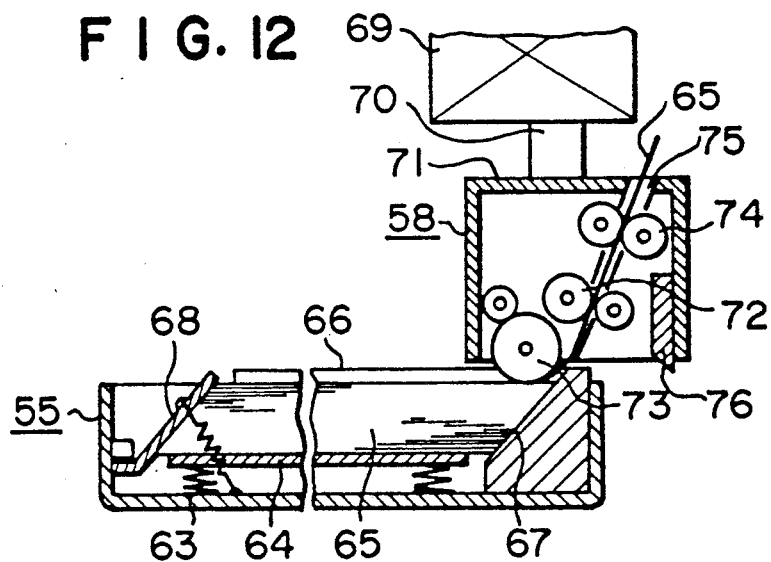
FIG. 12 is a front view in vertical section of a paper tray and a fixing device.
Figure 13:
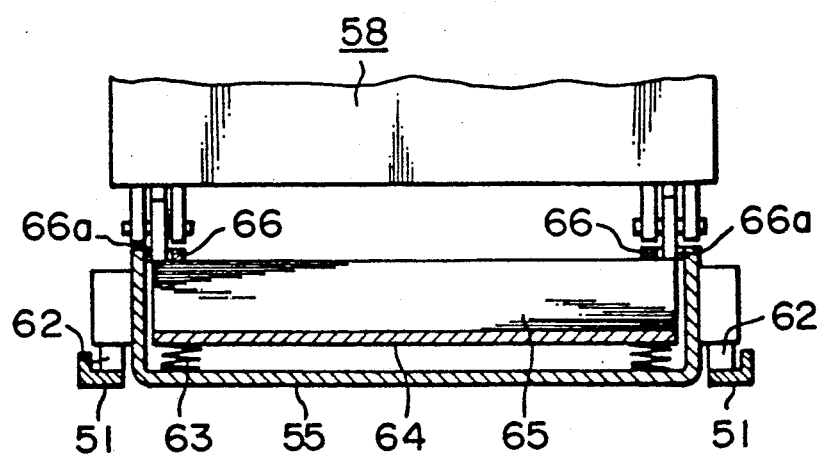
FIG. 13 is a side view in vertical section of the paper tray.
Figure 14:
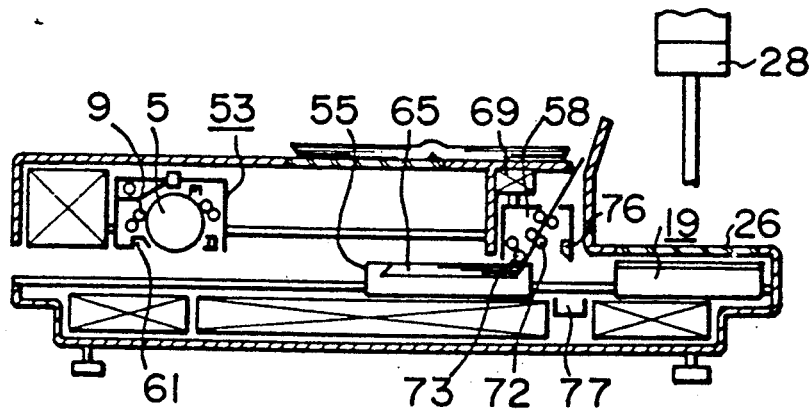
FIGS. 14 (a)-(e) are overall front views in vertical section excluding the projection mechanism portion for showing flow of operations with the passage of time.
Figure 14:
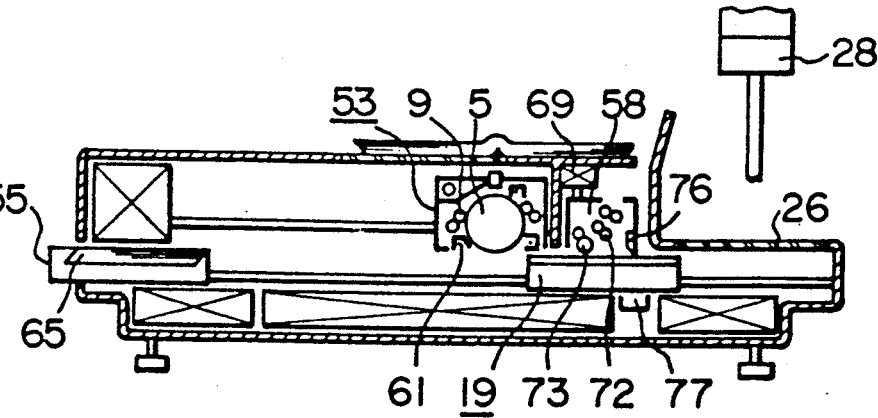
Figure 15:
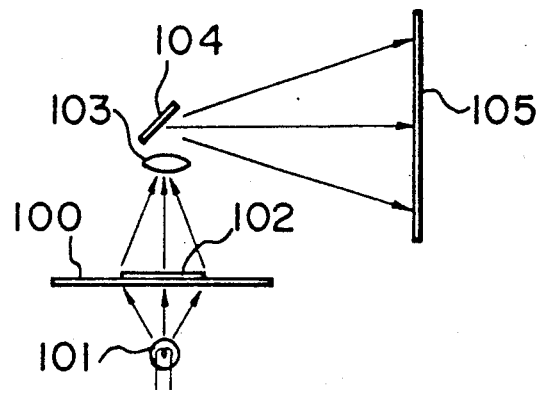
FIG. 15 is a front view of a conventional overhead projector of a purely optical system for showing its principle.
Figure 16:
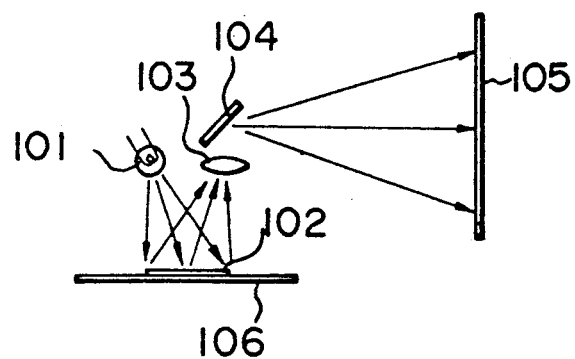
FIG. 16 is a front view of another example of the same for showing its principle.

The paper tray 55, as shown in FIG. 13, is provided with rollers 62 rolling on the rails 51 at both sides thereof. Within the same, as shown in FIGS. 12 and 13, there are provided a vertically movable plate 64 biased by springs 63, presser edges 66 pressing down sheets of paper 65 piled up on the vertically movable plate 64 at both sides thereof, inclined ribs 67 allowing the paper 65 to be led obliquely to the upper front, and presser plates 68 for pressing the sheets of paper 65 against the inclined ribs 67. Here, the inclined ribs 67 and the presser plates 68, as well as the presser edges 66, are arranged only for ends of the paper 65, and these presser edges 66, inclined ribs 67, and the presser plates 68 are situated so that these members may not interfere with the photosensitive drum 5 when the paper tray 55 moves relatively to the duplication mechanism 53 and crosses the same.

The fixing device 58, as shown in FIG. 12, has a vertically movable member 71 coupled to a plunger 70 of an electromagnet 69 fixed to the housing 1, and in the vertically movable member 71, there are rotatably mounted heat fixing rollers 72 sandwiching the paper 65 therebetween and paper feed rollers 73, 74 situated above and below the heat fixing rollers 72 for feeding the paper 65. In the top plate of the vertically movable member 71 is made an opening 75 for discharging the paper 65 therethrough, and to the side plate is fixed a blade 76 as the cleaning mechanism to remove the transferred image on the light reflecting panel mechanism 19. And, as shown in FIG. 9, a toner reservoir 77 is provided in the position corresponding to the blade 76 removably retained by the lower portion of the housing 1.

With the described structure, the projection of an image onto the screen is carried out taking similar steps as those in the first embodiment. The process from such image projection down to hard-copying of the image is shown in FIGS. 14(a)-(e) with the passage of time.

FIG. 14(a) shows an initial state. In order to make projection of the image of the original 2 from this state, the duplication mechanism 53 is shifted to the left until the state as shown in FIG. 14(b) is reached. In that course, the image of the original 2 is optically read by the duplication mechanism 53, the image is developed through the above described process, and the developed image is transferred onto the surface of the light reflecting panel mechanism 19. Immediately thereafter, the charge on the photosensitive drum 5 is removed by the discharger 10 and the residual toner on the photosensitive drum 5 is cleared by the photosensitive member cleaning mechanism 11. When the image transfer to the light reflecting panel mechanism 19 is finished, the light reflecting panel mechanism 19 is shifted to the right end of the housing 1 and stops right under the transmission window 26, and the duplication mechanism 53 is also shifted to the right end of the housing 1 to be reset to the initial position. In this state, the image transferred to the light reflecting panel mechanism 19 is used for the projection.

Then, in order to duplicate the same image as that on the screen, a duplication switch on the control panel 34 is operated. Then, the paper tray 55, as shown in FIG. 14(c), is shifted from the left end to the middle of the housing 1 and set in a predetermined standby position. In succession thereto, in the same way as in the above described image transfer to the light reflecting panel mechanism 19, an electrostatic latent image is formed on the photosensitive drum 5 and it is developed to provide a duplicated image in the course of the shift of the duplication mechanism 53 to the left and the rotation of the photosensitive drum 5 in a counterclockwise direction, and when the duplication mechanism 53 passes over the copying paper 65, the topmost sheet of paper 65 in the paper tray 55 is charged by means of the transfer charger 61, whereby the developing agent 8 forming the duplicated image on the photosensitive drum 5 is attracted to the paper 65 and thus the duplicated image is transferred to the same. When the image transfer to the paper 65 has been finished in the described manner, the paper tray 55 is shifted to the right as far as its right end comes under the paper feed roller 73 as shown in FIG. 14(d). In succession thereto, the electromagnet 69 is actuated to lower the fixing device 58 and the topmost sheet of paper 65 in the paper tray 55 is discharged upward by means of the paper feed rollers 73, 75, and during this course, the transferred image is fixed on the paper 65 by means of the heat fixing roller 72. At this time, the lower paper feed rollers 73 are inserted in roller holes 66a made in the presser edges 66 of the paper tray 55 (FIG. 13) so that they may not come in touch with the transferred image. When the fixed paper 65 has been discharged through the opening 75, the electromagnet 69 is actuated again to elevate the fixing device 58 and the paper tray 55 is reset to the left end of the housing 1.

When the projection and duplication have been finished in the described manner, the light reflecting panel mechanism 19 is shifted to the left by pressing a reset button on the control panel 34, and in synchronism therewith, the vertically movable member 71 of the fixing device 58 is lowered by means of the electromagnet 69, whereby the blade 76 is brought into contact with the surface of the light reflecting panel mechanism 19 to scrape the toner forming the transferred image as shown in FIG. 14(e) and, with the leftward movement of the light reflecting panel mechanism 19, sweeps the toner down into the toner pool 77.

According to the present embodiment, as described above, the same image as is projected can be hard-copied. At this time, hard-copying does not require one to mount the paper 65 on the apparatus but the hard-copying can be carried out easily and quickly. Also, the projected condition is not at all affected by the hard-copying of the same image as is projected, because the paper tray 55 in the course of copying does not interfere with the light reflecting panel mechanism 19 in the projected position.

What is claimed is:

1. An apparatus for projecting an image comprising:
  a latent image forming member on which a latent image corresponding to an original image is formed;
  developing means for developing the latent image on said latent image forming member into a duplicated image by use of a developing agent;
  a panel mechanism comprising an optical surface and a light converging member, for transmitting therethrough and converging a reflected beam of light from said optical surface,
  means for transferring the duplicated image on said latent image forming member to said panel mechanism so that a transferred image is formed thereon;
  projection means for illuminating the surface of said panel mechanism on which the transferred image is formed and for projecting the transferred image onto a screen;
  a cleaning mechanism for removing the transferred image on the surface of said panel mechanism; and
  means for reciprocating said panel mechanism between a transfer position where the duplicated image on said latent image forming member is transferred thereto and a projection position, wherein said panel mechanism is cleared of the duplicated image thereon by said cleaning mechanism in the course of a reset movement from the projection position to the transfer position, wherein said panel mechanism is shaped in the form of a flat plate so that a transferred image is formed on the upper surface thereof, and wherein said cleaning mechanism is provided with means for vertical movement thereof and the cleaning mechanism is lowered and brought into contact with the surface of said panel mechanism on which the transferred image is formed only during movement of said panel mechanism from said projection position to said transfer position when the transferred image is to be removed.

2. An apparatus for projecting an image according to claim 1, wherein said panel mechanism has light transmission means.

3. An apparatus for projecting an image according to claim 1 wherein said panel mechanism comprises a light reflecting panel mechanism and said optical surface is a reflecting surface.

4. An apparatus for projecting an image according to claim 3, wherein a photosensitive member is used for said latent image forming member, whereby it is adapted such that an electrostatic latent image is formed on the photosensitive member.

5. An apparatus for projecting an image according to claim 3, wherein said latent image forming member is a photosensitive drum, and wherein said panel mechanism is provided for reciprocation in contact with said photosensitive drum and a rotation of said photosensitive drum and a traveling of said panel mechanism are synchronized.

6. An apparatus for projecting an image according to claim 3, wherein an upper surface of said panel mechanism is formed of a Fresnel lens.

7. An apparatus for projecting an image according to claim 6 wherein said light reflecting panel mechanism includes an electrode to apply a transfer surface of said light reflecting panel mechanism with a predetermined potential and adapted such that the duplicated image on said latent image forming member is transferred to said transfer surface so that a transferred image is formed thereon.

8. An apparatus for projecting an image according to claim 7, wherein said reflecting surface is formed of said electrode.

9. An apparatus for projecting an image according to claim 8, wherein said latent image forming member is a photosensitive drum, and wherein said panel mechanism is provided for reciprocation in contact with said photosensitive drum and a rotation of said photosensitive drum and a traveling of said panel mechanism are synchronized.

10. An apparatus for projecting an image according to claim 7, wherein said developing agent is charged and said electrode is adapted to be provided with a potential of the opposite polarity to that of the developing agent in the course of movement of said light reflecting panel mechanism from a transferred position thereof to a projected position thereof and with a potential of the same polarity to that of the developing agent in the course of cleaning after projection has been finished.

11. An apparatus for projecting an image according to claim 3 including a transmission window situated at a side of said panel mechanism facing said projection means and formed of a transparent material for transmitting the transferred image on said light reflecting panel mechanism therethrough.

12. An apparatus for projecting an image according to claim 1 wherein said panel mechanism includes an electrode to apply to a transfer surface of said panel mechanism a predetermined potential and adapted such that the duplicated image on said latent image forming member is transferred to said transfer surface so that a transferred image is formed thereon.

13. An apparatus for projecting an image according to claim 12 wherein said reflecting surface is formed of said electrode.

14. An apparatus for projecting an image according to claim 12 including a charged developing agent, wherein said electrode is adapted to be provided with a potential of the opposite polarity to that of the developing agent in the course of movement of said light reflecting panel mechanism from a transferred position thereof to a projected position thereof and with a potential of the same polarity as that of the developing agent in the course of cleaning after projection has been finished.

15. An apparatus for projecting an image comprising:
  a latent image forming member on which a latent image corresponding to an original image is formed;

developing means for developing the latent image on said latent image forming member by use of a developing agent;

a panel mechanism comprising an optical surface and a light converging member, for transmitting therethrough and converging a reflected beam of light from said optical surface, means for transferring a developed image on said latent image forming member to said panel mechanism so that a transferred image is formed thereon;

projection means for illuminating the surface of said panel mechanism on which the transferred image is formed and for projecting the transferred image formed on the surface of said panel mechanism onto a screen;

a cleaning mechanism for removing the transferred image on the surface of said panel mechanism;

a transferring device for transferring a duplicated image on said latent image forming member to paper;

a fixing device for fixing the transferred image transferred to the paper; and means for simultaneously vertically moving said fixing device and said cleaning mechanism.

16. An apparatus for projecting an image according to claim 15, wherein said panel mechanism, when situated in a transfer position thereof by said projection means, does not interfere with movement of the paper between a transfer position thereof and a fixation position thereof.

* * * * *